(12) United States Patent
Lehman et al.

(10) Patent No.: US 9,518,722 B1
(45) Date of Patent: Dec. 13, 2016

(54) CENTER BEAM EDGE-LIT LIGHTING STRUCTURE

(71) Applicants: Gregg Arthur Lehman, Peachtree City, GA (US); Paul Wayne Lewis, Jr., Grantville, GA (US)

(72) Inventors: Gregg Arthur Lehman, Peachtree City, GA (US); Paul Wayne Lewis, Jr., Grantville, GA (US)

(73) Assignee: Cooper Technologies Company, Houston, TX (US)

( * ) Notice: Subject to any disclaimer, the term of this patent is extended or adjusted under 35 U.S.C. 154(b) by 47 days.

(21) Appl. No.: 14/026,180

(22) Filed: Sep. 13, 2013

(51) Int. Cl.
*F21V 7/04* (2006.01)
*F21V 15/01* (2006.01)

(52) U.S. Cl.
CPC .................................. *F21V 15/011* (2013.01)

(58) Field of Classification Search
CPC ... G02B 6/3504; G02B 6/0086; G02B 6/0088; F21V 2008/006; F21V 2008/008; F21V 14/06; F21V 15/011; F21S 8/026
USPC ................ 362/633, 607, 616, 617, 632, 224
See application file for complete search history.

(56) References Cited

U.S. PATENT DOCUMENTS

| D120,548 S | 5/1940 | Guth |
| D122,145 S | 8/1940 | MacCarthy |
| D122,887 S | 10/1940 | Beals |
| D123,067 S | 10/1940 | Rubinstein |
| D128,961 S | 8/1941 | Hrabak |
| D147,812 S | 11/1947 | Picker |
| D257,894 S | 1/1981 | DiBernardo |
| D306,773 S | 3/1990 | Roulstone |
| 5,803,589 A | 9/1998 | Lee |
| 5,855,427 A * | 1/1999 | Lassovsky ................... 362/283 |
| D447,266 S | 8/2001 | Verfuerth |
| D463,059 S | 9/2002 | Verfuerth |
| 6,517,216 B1 * | 2/2003 | Cercone ................. F21S 8/026 362/220 |
| 6,607,289 B2 * | 8/2003 | Lassovsky ................... 362/283 |
| D485,932 S | 1/2004 | Crane |
| 7,207,690 B2 | 4/2007 | Haugaard et al. |
| 7,793,447 B2 | 9/2010 | Fang et al. |
| D632,418 S | 2/2011 | Bisberg et al. |
| D645,194 S | 9/2011 | Budike et al. |
| 8,388,210 B2 * | 3/2013 | Paterson ...................... 362/633 |
| 8,662,731 B2 * | 3/2014 | Wang et al. .................. 362/632 |
| D703,858 S | 4/2014 | Miller |
| D711,037 S | 8/2014 | Lehman et al. |
| 8,926,112 B2 * | 1/2015 | Uchiike et al. .............. 362/97.1 |
| 2010/0128480 A1 | 5/2010 | Watanabe et al. |

(Continued)

*Primary Examiner* — Anh Mai
*Assistant Examiner* — Matthew Peerce
(74) *Attorney, Agent, or Firm* — King & Spalding LLP

(57) ABSTRACT

An edge-lit lighting structure includes a first end panel and a second end panel. The edge-lit lighting structure further includes a first side panel extending between the first end panel and the second end panel at a first longitudinal side of the edge-lit lighting fixture. The edge-lit lighting structure also includes a second side panel extending between the first end panel and the second end panel at a second longitudinal side of the edge-lit lighting fixture opposite the first longitudinal side. Further, the edge-lit lighting structure includes a center beam having a hollow portion. The center beam is positioned between the first side panel and the second side panel and is attached to the first end panel and the second end panel.

12 Claims, 16 Drawing Sheets

(56) References Cited

U.S. PATENT DOCUMENTS

| | | | |
|---|---|---|---|
| 2010/0195350 A1* | 8/2010 | Schattinger et al. | 362/612 |
| 2010/0315810 A1* | 12/2010 | Tseng | F21V 14/02 |
| | | | 362/234 |
| 2011/0199789 A1* | 8/2011 | Huang et al. | 362/616 |
| 2011/0204794 A1* | 8/2011 | Beghelli | 315/152 |
| 2012/0206911 A1* | 8/2012 | Pickard et al. | 362/231 |
| 2012/0250296 A1* | 10/2012 | Lu et al. | 362/147 |

* cited by examiner

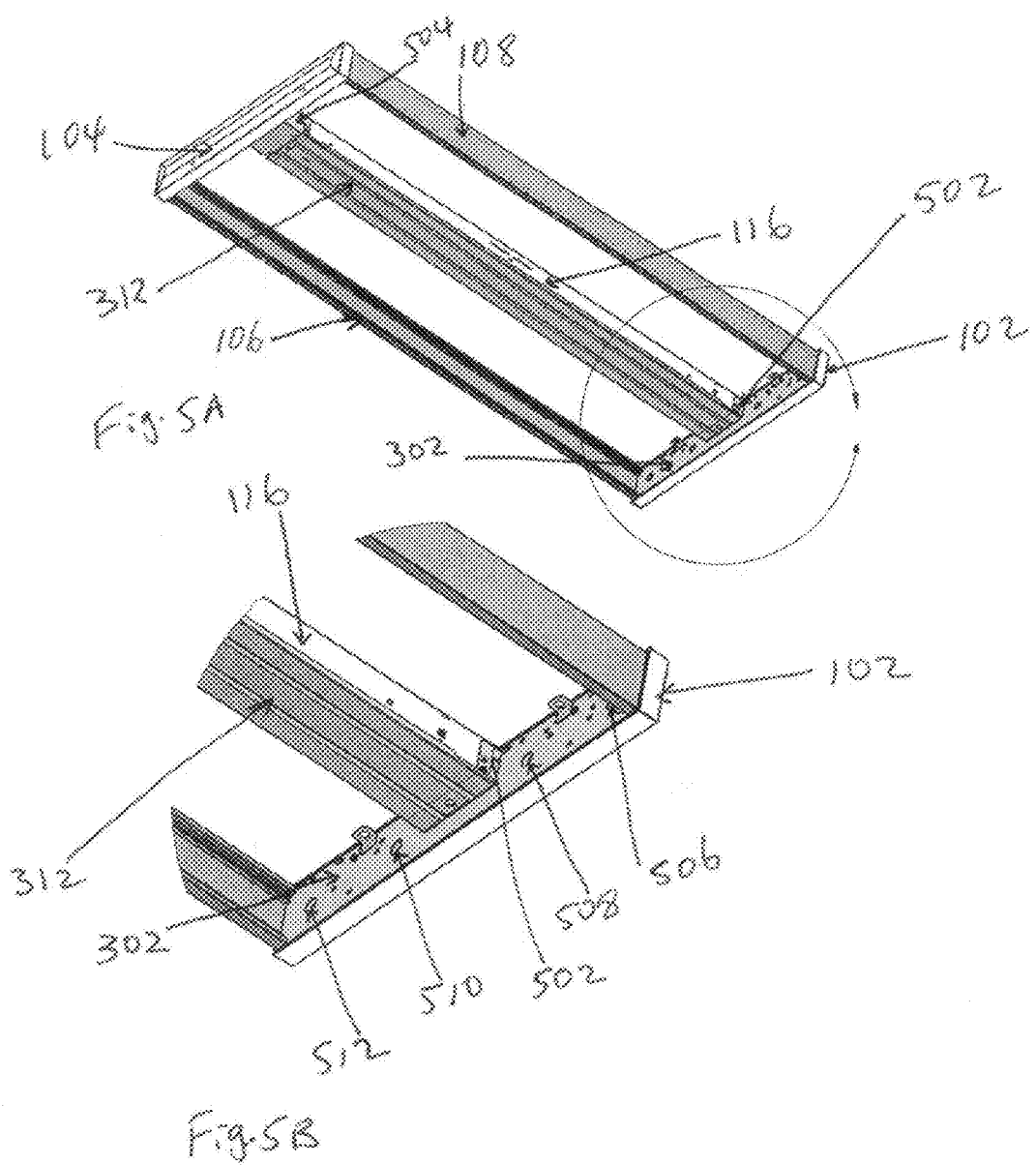

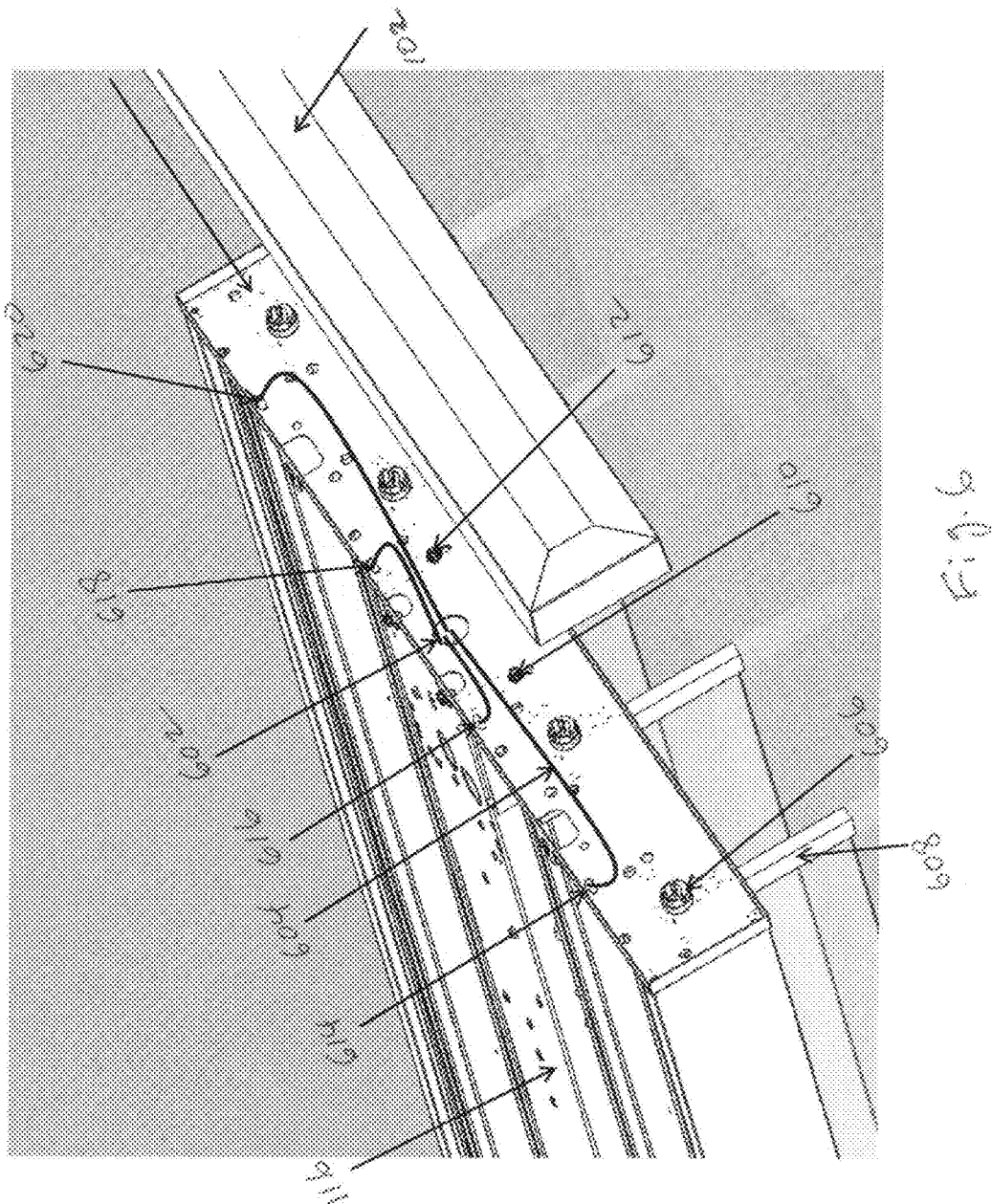

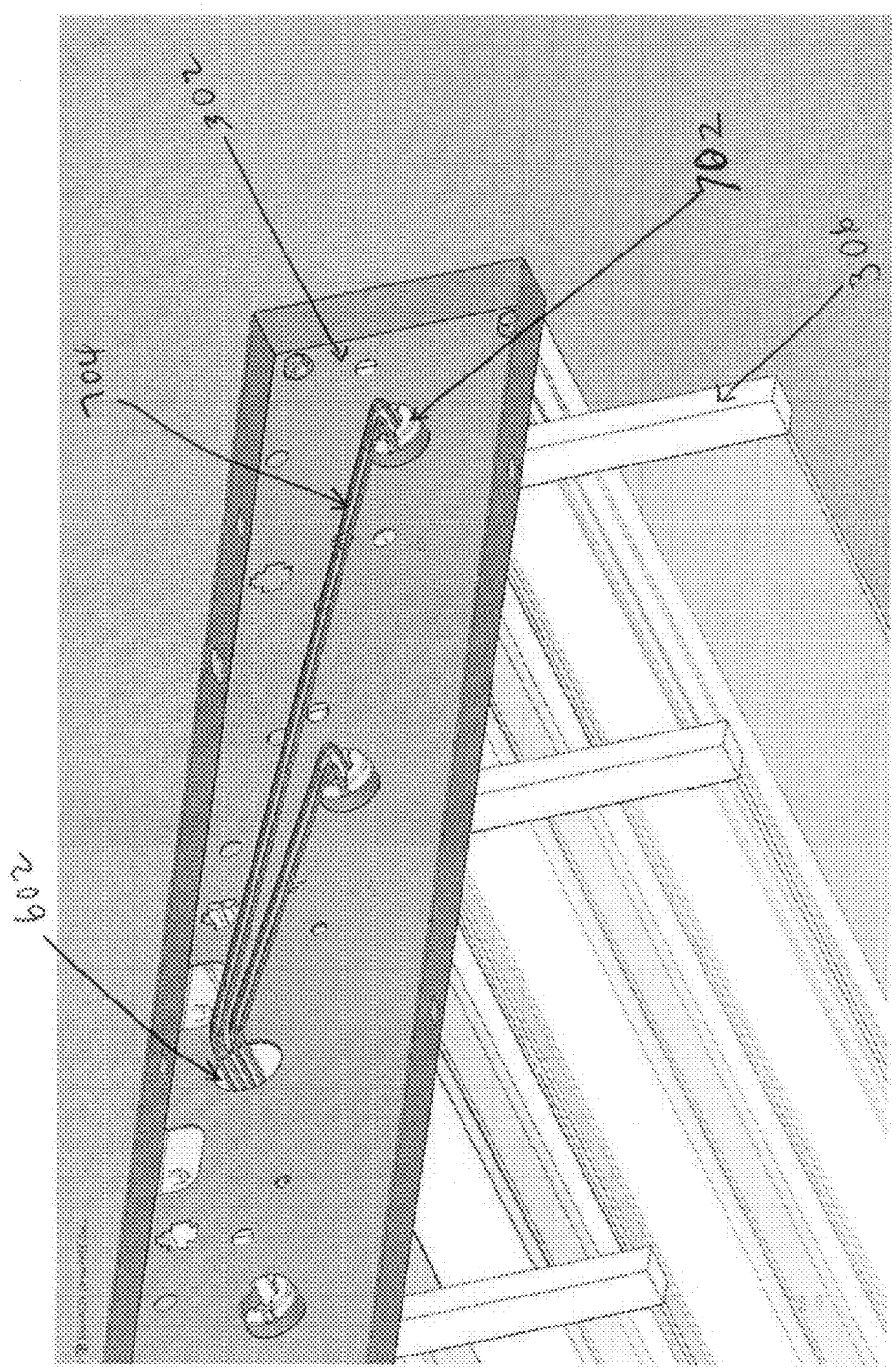

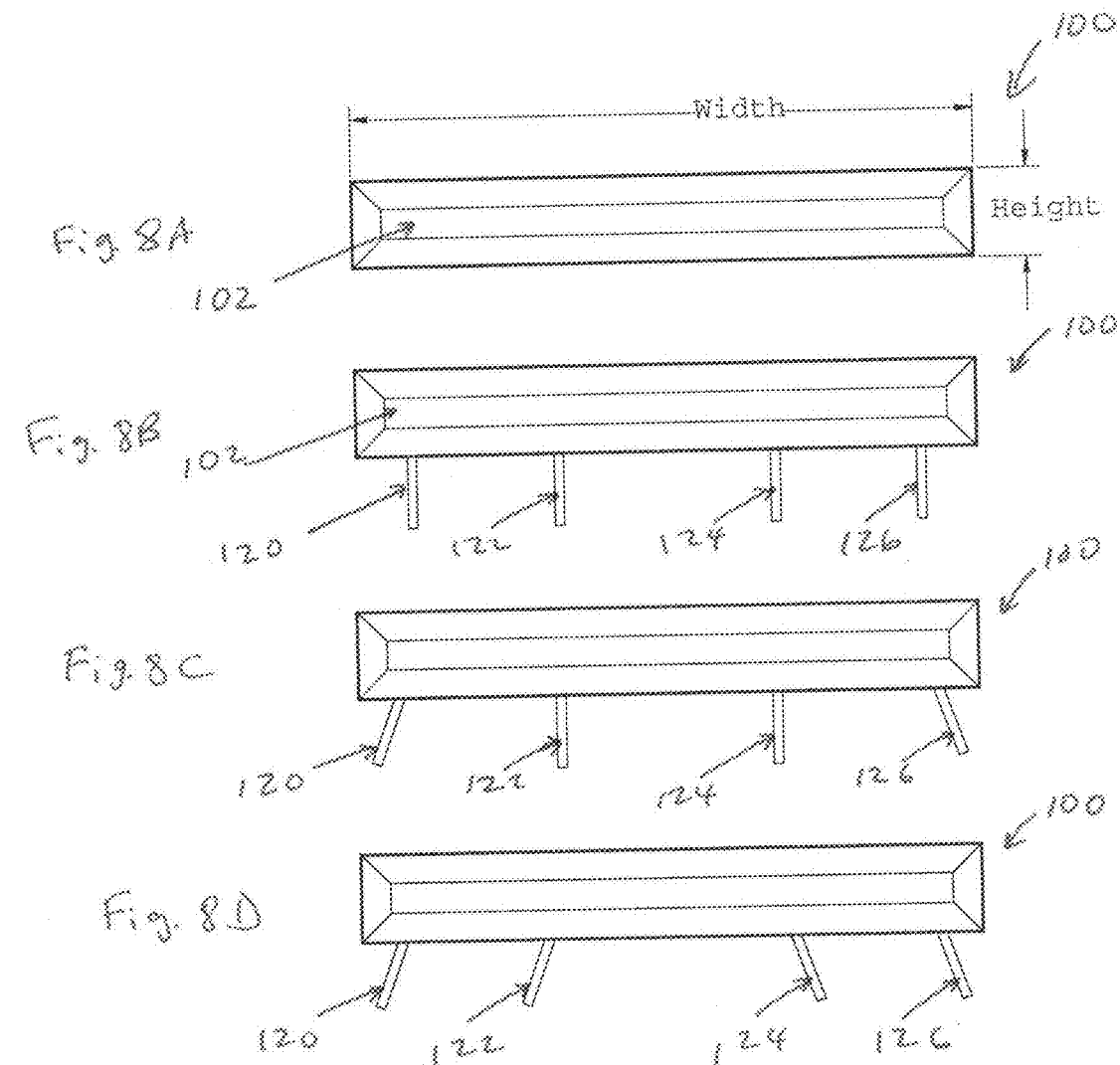

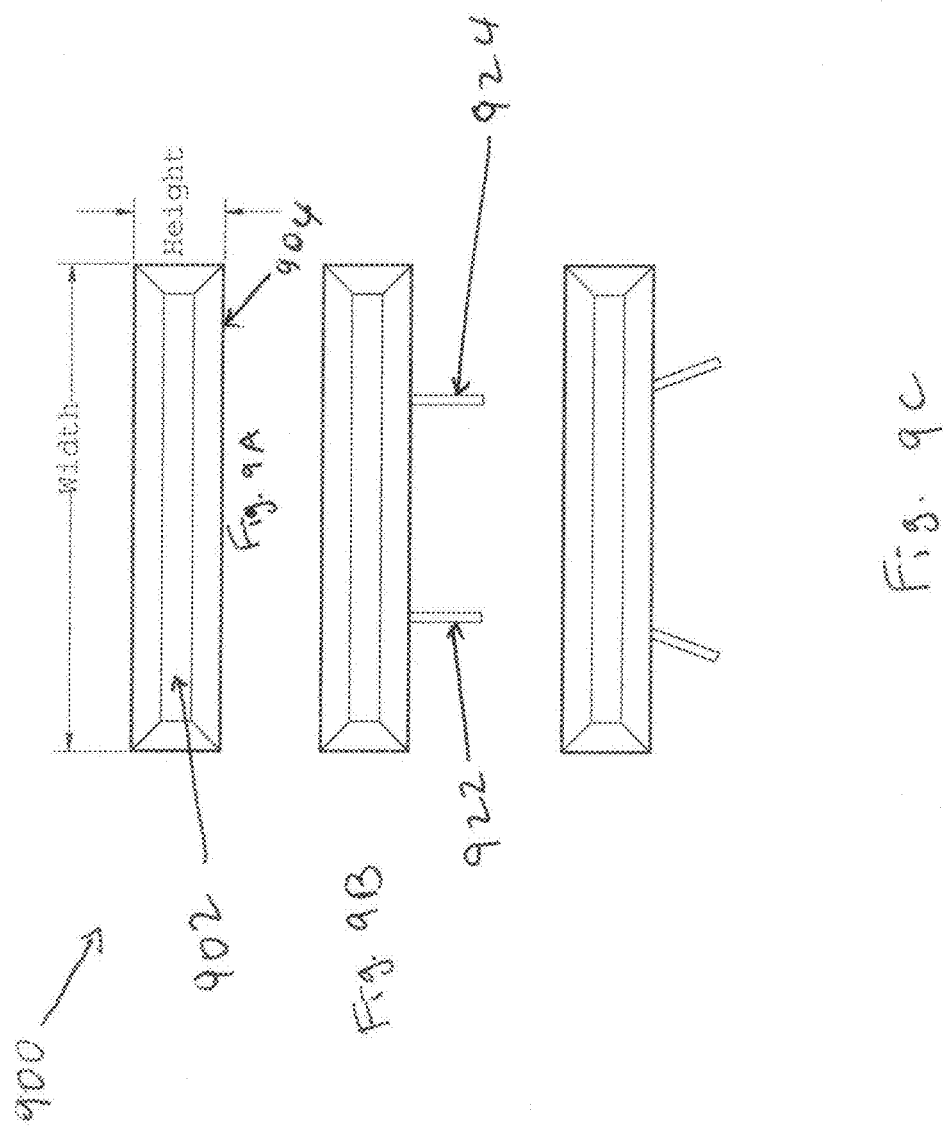

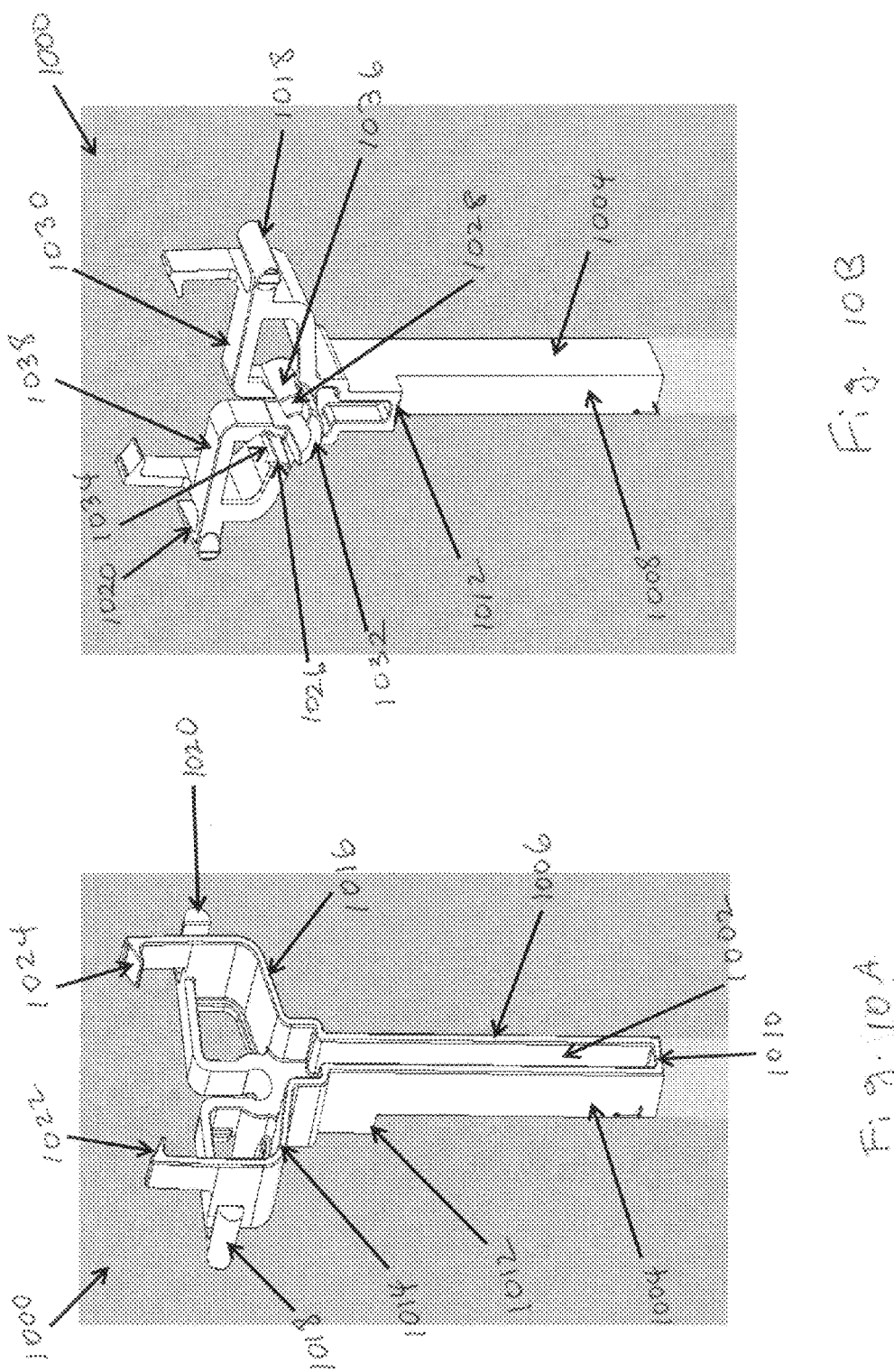

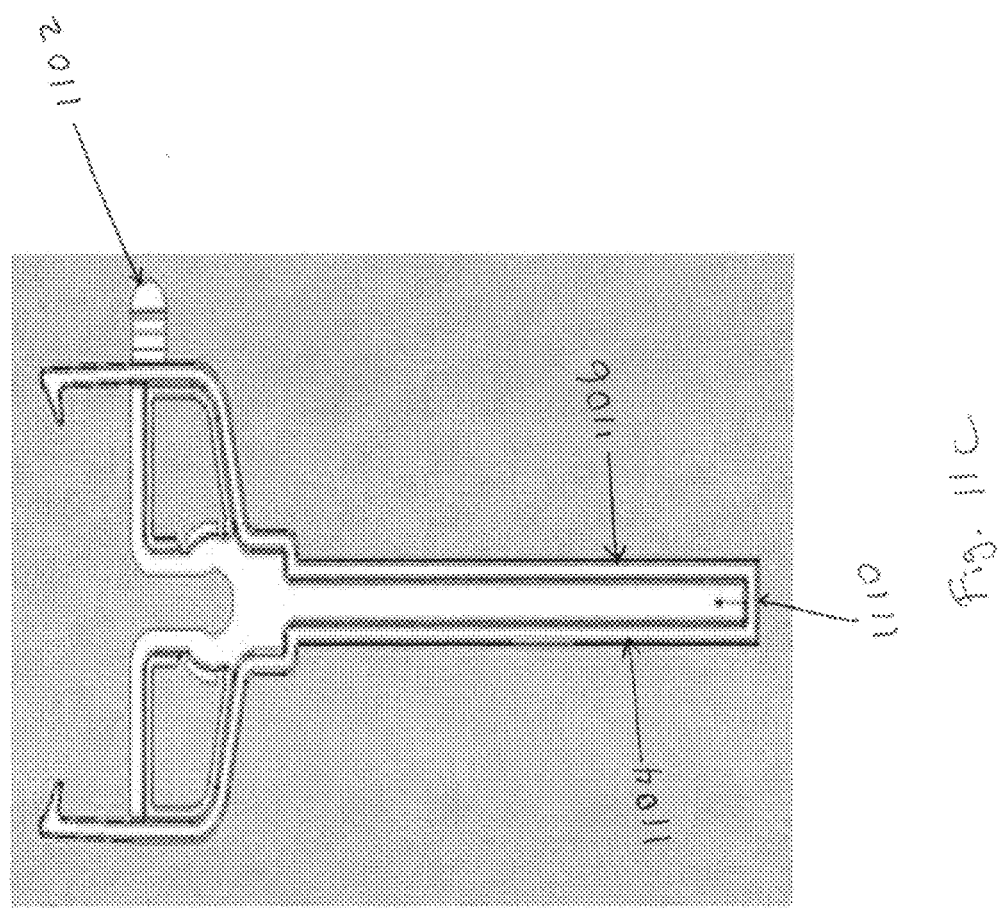

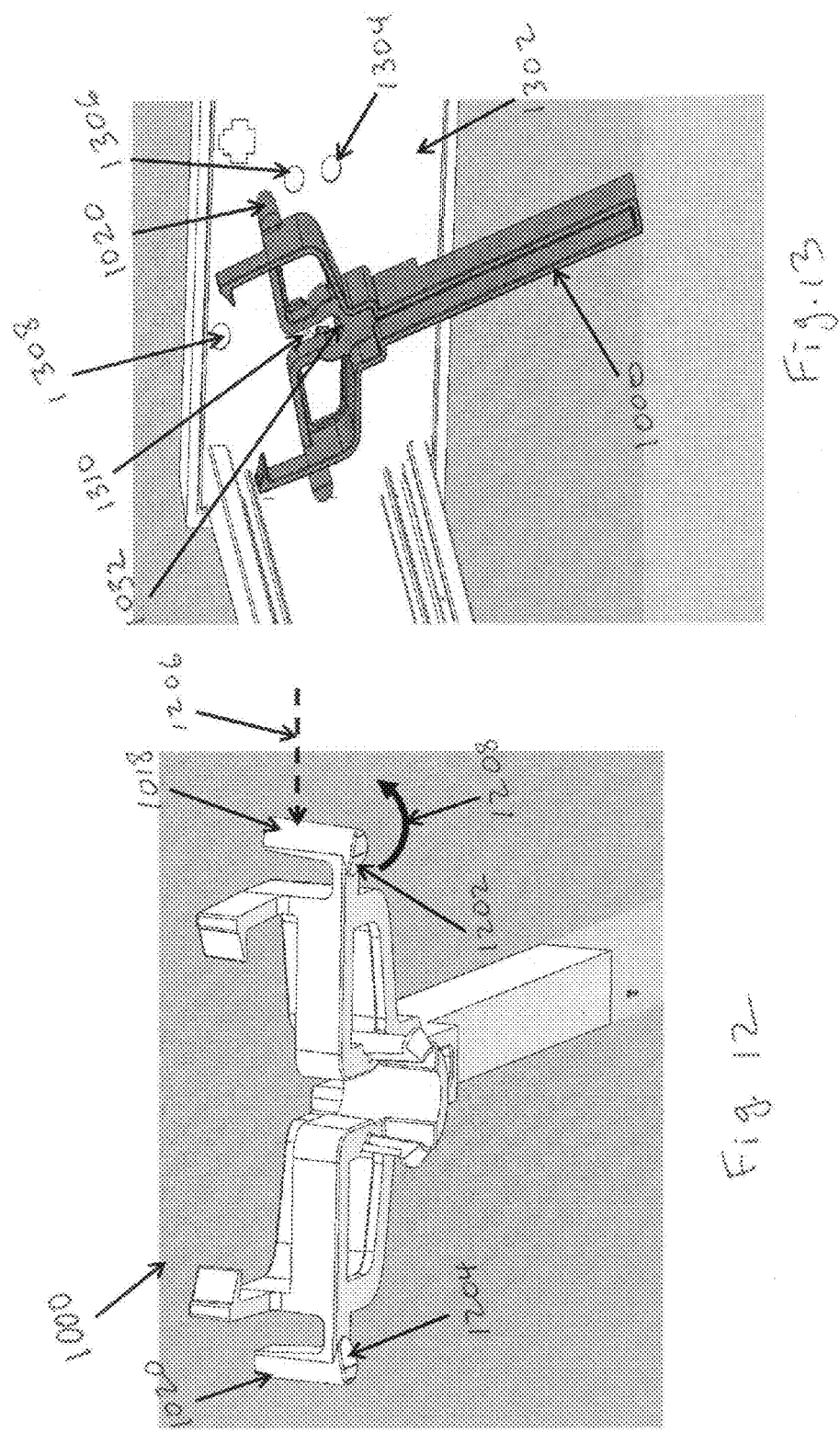

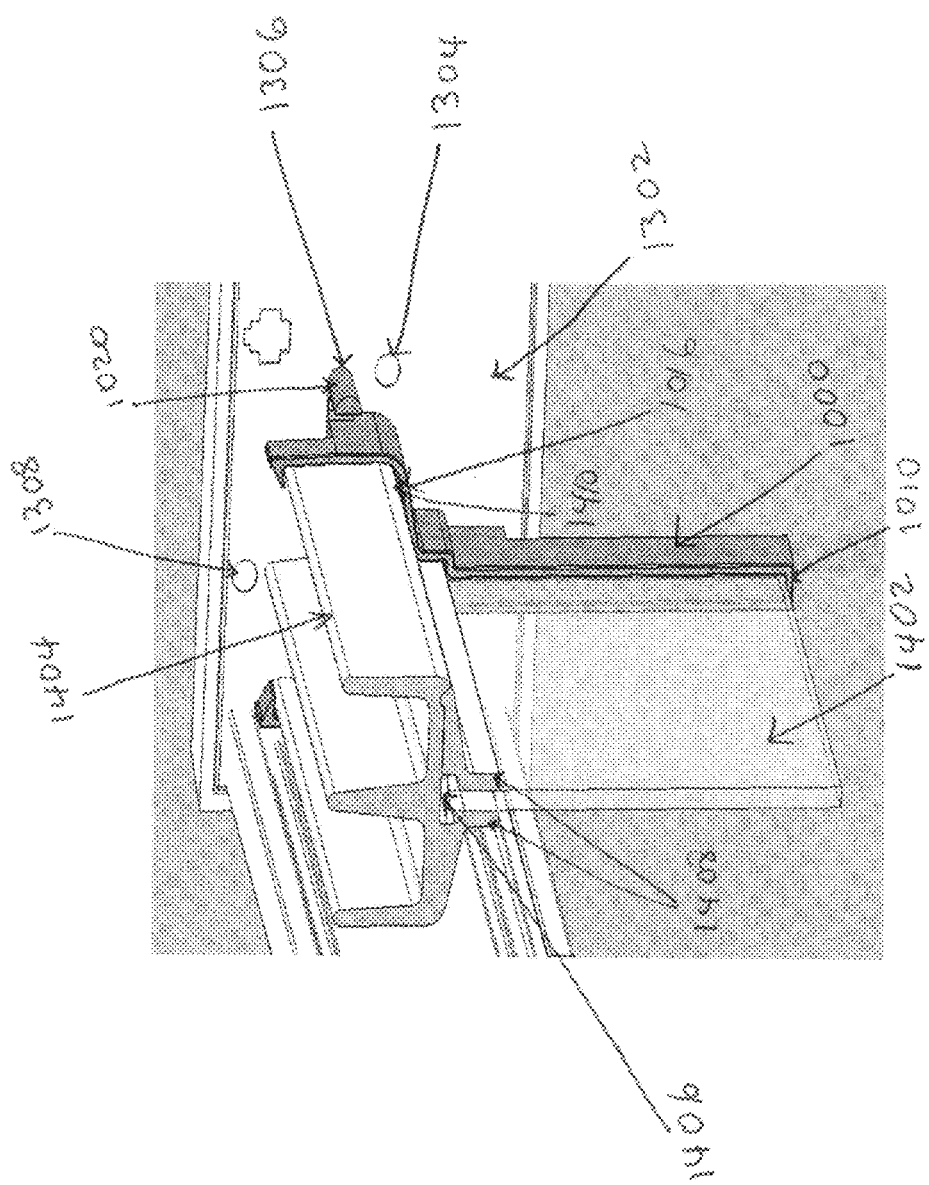

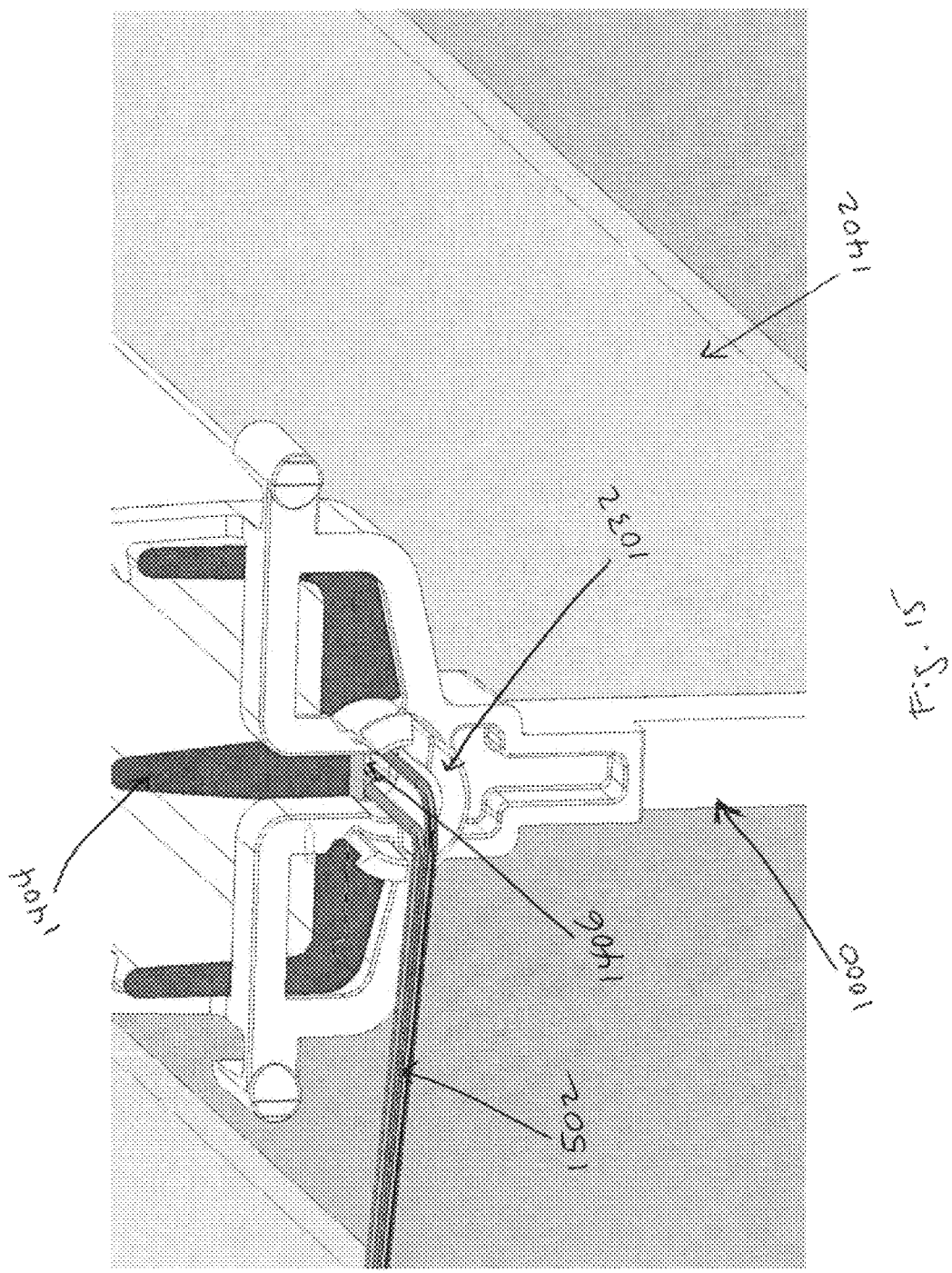

CENTER BEAM EDGE-LIT LIGHTING STRUCTURE

TECHNICAL FIELD

The present disclosure relates generally to an edge-lit lighting structure, in particular to a center beam edge-lit lighting structure and fixture.

BACKGROUND

Edge-lit lighting fixtures generally have one or more light sources that are attached to an outer structure, such as a light fixture. In some cases, the outer structure may be a lighting fixture housing that has a back cover attached to side structures that are arranged to have, for example, a rectangular perimeter. Some edge-lit light fixtures may also include one or more heat sinks that dissipate heat from the light sources and also provide structural rigidity to the light fixtures. Replacing the light sources may require removal of the heat sinks. However, because the heat sinks provide structural rigidity to the lighting fixture, replacing the light sources of the edge-lit lighting fixture may require uninstalling of the lighting fixture to avoid compromising the structural integrity of the lighting fixture.

Some edge-lit lighting fixtures may also include one or more drivers that provide power to the light sources. The driver(s) may be positioned within an end cap of the outer structure. Alternatively, the driver(s) may be placed behind a back cover of the outer structure. Placing the driver(s) behind the back cover requires the light fixture to have the back cover in the first instance. Further, the shape of the back cover also needs to be designed to accommodate attachment of the driver(s) to the back cover.

To place the driver(s) in an end cap instead of behind the back cover, the end cap has to be large enough to accommodate the driver. The end cap also needs to have a shape that allows the driver to be placed within it. However, end caps are often designed for aesthetic value. Thus having an end cap that is sized and shaped to accommodate the driver(s) may compromise the aesthetic value of the end cap. Similarly, availability of usable drivers may be limited by the size and shape of an end cap.

Further, edge-lit lighting fixtures generally include some means of installing light emitting panels (LEPs) to the housing. For example, an LEP may be fastened to a heat sink that is attached to opposite ends of the housing. A bracket that may be used to rotatably install the LEP within an edge-lit lighting fixture can simplify installation and replacement of the LEP.

Accordingly, an edge-lit lighting structure that does not require removal of an entire lighting fixture to replace a lighting source and that provides flexibility in the size and shape of end caps and driver(s) for the lighting fixture may be desirable. Further, a bracket that can rotatably attach an LEP to the lighting structure is desirable.

SUMMARY

In general, the present disclosure relates to a center beam edge-lit lighting structure and fixture. In an example embodiment, an edge-lit lighting structure includes a first end panel and a second end panel. The edge-lit lighting structure further includes a first side panel extending between the first end panel and the second end panel at a first longitudinal side of the edge-lit lighting fixture. The edge-lit lighting structure also includes a second side panel extending between the first end panel and the second end panel at a second longitudinal side of the edge-lit lighting fixture opposite the first longitudinal side. Further, the edge-lit lighting structure includes a center beam having a hollow portion. The center beam is positioned between the first side panel and the second side panel and is attached to the first end panel and the second end panel.

In another example embodiment, an edge-lit lighting fixture includes a first light emitting panel (LEP), a second LEP, and an edge-lit lighting structure. The edge-lit lighting structure includes a first end panel and a second end panel. The edge-lit lighting structure further includes a first side panel extending between the first end panel and the second end panel at a first longitudinal side of the edge-lit lighting fixture. The edge-lit lighting structure also includes a second side panel extending between the first end panel and the second end panel at a second longitudinal side of the edge-lit lighting fixture opposite the first longitudinal side. Further, the edge-lit lighting structure includes a center beam having a hollow portion. The center beam is positioned between the first side panel and the second side panel and is attached to the first end panel and the second end panel.

In another example embodiment, a light emitting panel (LEP) bracket for attaching an LEP to an end panel of an edge-lit lighting structure includes a channel configured to receive a portion of a narrow side of an LEP. The LEP bracket also includes a heat sink frame portion coupled to the channel. The LEP bracket further includes a support protrusion for insertion into an LEP bracket opening in an end panel of an edge-lit lighting structure to rotatably attach the LEP bracket to the end panel. The LEP bracket further includes an end panel snap lock for insertion into the LEP bracket opening. The end panel snap lock is configured to retain the LEP bracket attached to the end panel once the support protrusion is inserted into the LEP bracket opening.

These and other aspects, objects, features, and embodiments will be apparent from the following description and the claims.

BRIEF DESCRIPTION OF THE DRAWINGS

Reference will now be made to the accompanying figures, which are not necessarily to scale, and wherein:

FIG. 5A is a bottom view of the edge-lit lighting structure of FIG. 4A in accordance with an example embodiment;

FIG. 5B is close-up view of a portion of the edge-lit lighting structure of FIG. 5A in accordance with an example embodiment;

FIG. 6 is a partially exploded view of the edge-lit lighting fixture of FIG. 1 showing wire routing in accordance with an example embodiment;

FIG. 7 illustrates an end panel of the edge-lit lighting fixture of FIG. 1 showing wire routing in accordance with another example embodiment;

FIGS. 8A-D illustrate the edge-lit lighting fixture 100 of FIG. 1 with the LEPs in various orientations in accordance with an example embodiment;

FIGS. 9A-C illustrate a two-LEP edge-lit lighting fixture with the LEPs in various orientations in accordance with an example embodiment;

FIGS. 10A and 10B illustrate views of a light emitting panel (LEP) bracket in accordance with an example embodiment;

FIGS. 11A-11C illustrate views of the LEP bracket in accordance with another example embodiment;

FIG. 12 illustrates an operation of position snap locks of the LEP bracket of FIGS. 10A and 10B in accordance with an example embodiment;

FIG. 13 illustrates the LEP bracket of FIGS. 10A and 10B attached to an end panel in accordance with an example embodiment;

FIG. 14 illustrates the LEP bracket of FIGS. 10A and 10B attached to an end cap of an edge-lit lighting structure, and a cross section of an LEP that is supported by the LEP bracket in accordance with an example embodiment; and FIG. 15 illustrates wire routing through the LEP bracket of FIGS. 10A and 10B in accordance with an example embodiment.

Figure 1:
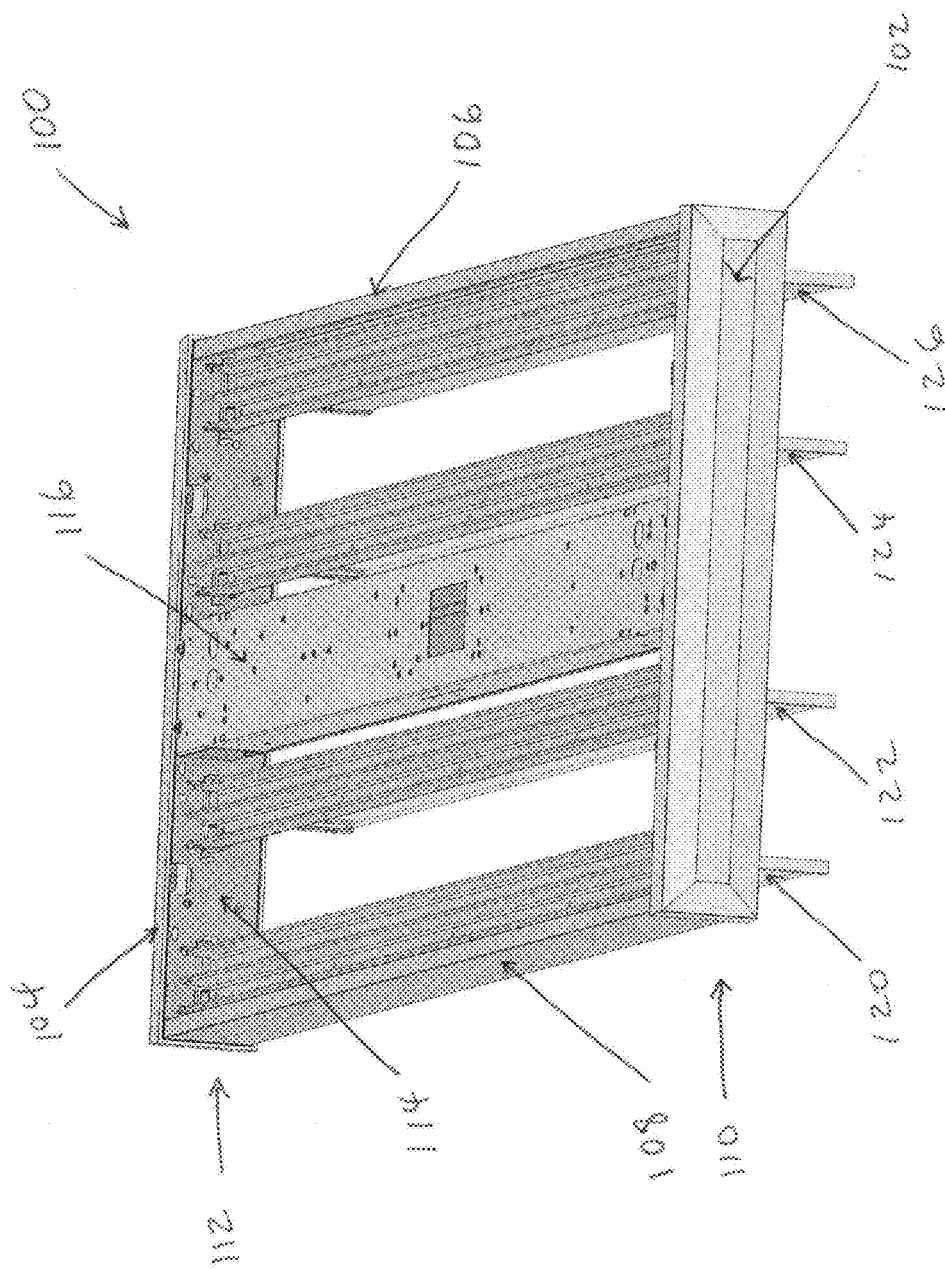
FIG. 1 is an angular top view of an edge-lit lighting fixture that includes a center beam in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, reference numerals designate like or corresponding, but not necessarily identical, elements.

DETAILED DESCRIPTION OF THE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, example embodiments are described. FIG. 1 is an angular top view of a center beam edge-lit lighting fixture in accordance with an example embodiment. In some example embodiments, the edge-lit lighting fixture 100 may be set in a high bay lighting fixture or another type of lighting fixture that includes a number of edge-lit light emitting panels.

The edge-lit lighting fixture 100 includes an edge-lit lighting structure (illustrated in FIG. 4A) and multiple light emitting panels. The edge-lit lighting structure includes a first end cap 102 and a second end cap 104. The first end cap 102 is attached to a first end panel (shown in FIG. 3A) at a first end 110 of the edge-lit lighting fixture 100, and the second end cap 104 is attached to a second end panel 114 at a second end 112 of the edge-lit lighting fixture 100. The edge-lit lighting structure also includes a first side panel 106, a second end panel 108, and a center beam 116. The first side panel 106 extends between the first end panel and the second end panel 114 at a first longitudinal side of the edge-lit lighting fixture 100.

Further, the second side panel 108 extends between the first end panel and the second end panel 114 at a second longitudinal side of the edge-lit lighting fixture 100. The center beam 116 is positioned between the first side panel 106 and the second side panel 108 and extends between the first end panel and the second end panel 114. For example, the center beam 116 may be attached to the first end panel and the second end panel 114. In some example embodiments, the center beam 116 has a hollow portion or may be entirely hollow. The center beam 116 may be made from sheet metal, such as aluminum sheet metal.

In some example embodiments, the edge-lit lighting fixture 100 includes four light emitting panels (LEPs) 120, 122, 124, and 126. Each of the LEPs 120, 122, 124, 126 may be positioned in the edge-lit lighting fixture 100 such that one or more light sources (e.g., light emitting diode(s)) can emit light into the particular LEP through a narrow side of the LEP. For example, a portion of each LEP 120, 122, 124, 126 may be attached to a respective heat sink that has one or more light sources (e.g., a printed circuit board including light sources) attached thereon. Each LEP 120, 122, 124, 126 may be made from an acrylic material, glass, or another suitable material, that allows light to enter the LEP through a narrow side of the LEP and to be emitted through one or more broad sides of the LEP. In some example embodiments, each LEP 120, 122, 124, 126 may be attached to the edge-lit lighting structure by two LEP brackets (e.g., LEP bracket 1000 of FIGS. 10A and 10B or LEP bracket 1100 of FIGS. 11A-11C) that are each attached to a respective end panel (i.e., the first end panel or the second end cap 104) of the edge-lit lighting structure.

The center beam 116 may be designed to accommodate drivers of varying sizes and shape. For example, the center beam 116 may contain one or more drivers (e.g., a light emitting diode (LED) driver) that provide power to light sources, such as light emitting diodes (LEDs), that emit light into the LEPs 120, 122, 124, 126. In some example embodiments, the center beam 116 may be able to contain one or more drivers that are each approximately half the length of the center beam 116. Power from a primary supply may be provided to the driver(s) via one or more electrical wires extending down (for example, from a ceiling structure) and passing through one or more apertures in the top surface of the center beam 116.

Because the center beam 116 can be designed to accommodate various size drivers without substantially affecting its size and shape, the appearance of the edge-lit lighting fixture 100 generally is not dependent on a particular driver's size and shape. Thus, placing drivers in the center beam 116 instead of in the first end cap 102 and/or in the second end cap 104 allows flexibility in the design of the first end cap 102 and the second end cap 104 for aesthetic reasons, and further allows for flexibility in selection of drivers, which may result in reduced cost. Further, the center beam 116 can be made cost effectively using sheet metal. Although the edge-lit lighting fixture 100 is illustrated in FIG. 1 as having four LEPs, in some alternative embodiments, the edge-lit lighting fixture 100 may have fewer or more than 4 LEPs. For example, the edge-lit lighting fixture 100 may have two LEPs, where the LEPs are positioned on opposite sides of the center beam 116. As another example, the edge-lit lighting fixture 100 may have six LEPs, with three of the LEPs being on one side of the center beam 116 and the other three being on the opposite side.

Figure 2:
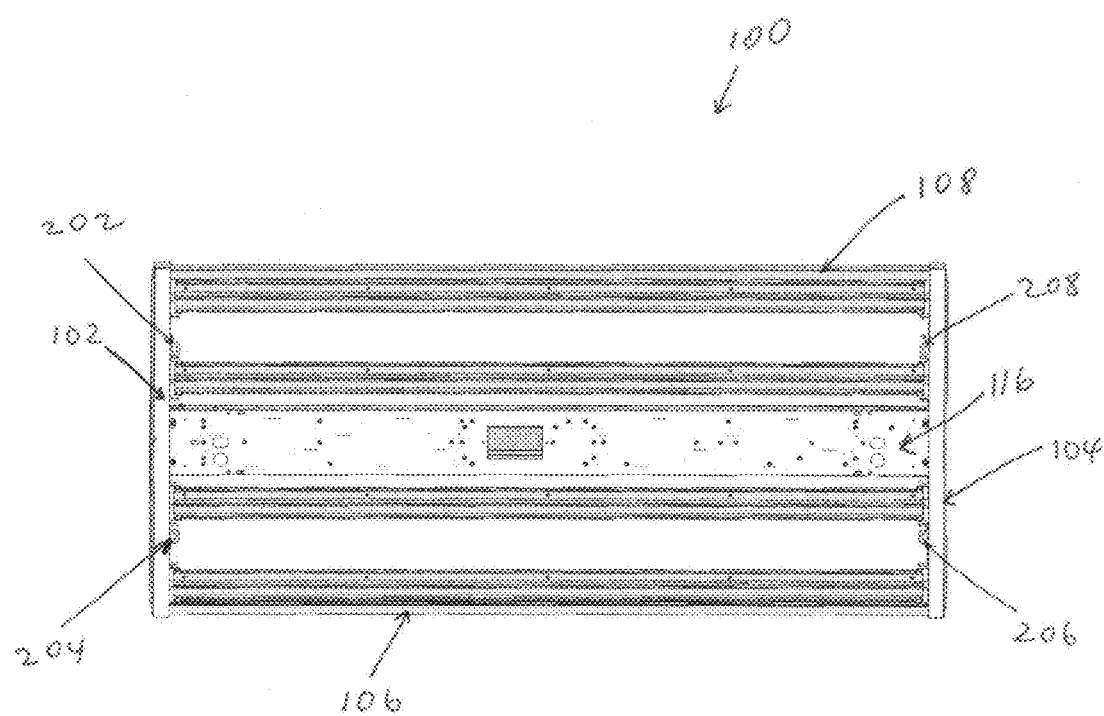
FIG. 2 is a top view of the edge-lit lighting fixture of FIG. 1 in accordance with an example embodiment.

FIG. 2 is a top view of the center beam edge-lit lighting fixture 100 of FIG. 1 in accordance with an example embodiment. As illustrated in FIG. 2, the edge-lit lighting fixture 100 includes tabs 202, 204, 206, and 208. The first and second tabs 202, 204 are proximal to the first end cap 102, and the third and fourth tabs 206, 208 are proximal to the second end cap 104. The first tab 202 and the fourth tab 208 are positioned between the center beam 116 and the second side panel 108. The second tab 204 and the third tab 206 are positioned between the center beam 116 and the first side panel 106. As illustrated in FIG. 2, the first tab 202 and the fourth tab 208 do not vertically overlap the first LEP 120 and the second LEP 122 shown in FIG. 1. Similarly, the second tab 204 and the third tab 206 do not vertically overlap the third LEP 120 and the fourth LEP 122. In some example embodiments, the first and second tabs 202, 204 may be coupled to the first end panel shown in FIG. 3A, and the third and fourth tabs 206, 208 may be coupled to the second end panel 114. For example, each tab 202, 204, 206, 208 may be integrally formed from the respective end panel or may be attached by various means such as screws and rivets.

In some example embodiments, the tabs 202, 204, 206, and 208 may be used to suspend the edge-lit lighting fixture 100 from a structure such as a ceiling. For example, a respective cable may be attached to each tab 202, 204, 206, 208 and to a ceiling structure. Although FIG. 2 shows four tabs 202, 204, 206, and 208, in alternative embodiments, the edge-lit lighting fixture 100 may include fewer or more than four tabs. For example, a single tab may be coupled to each end panel.

Figure 3A:
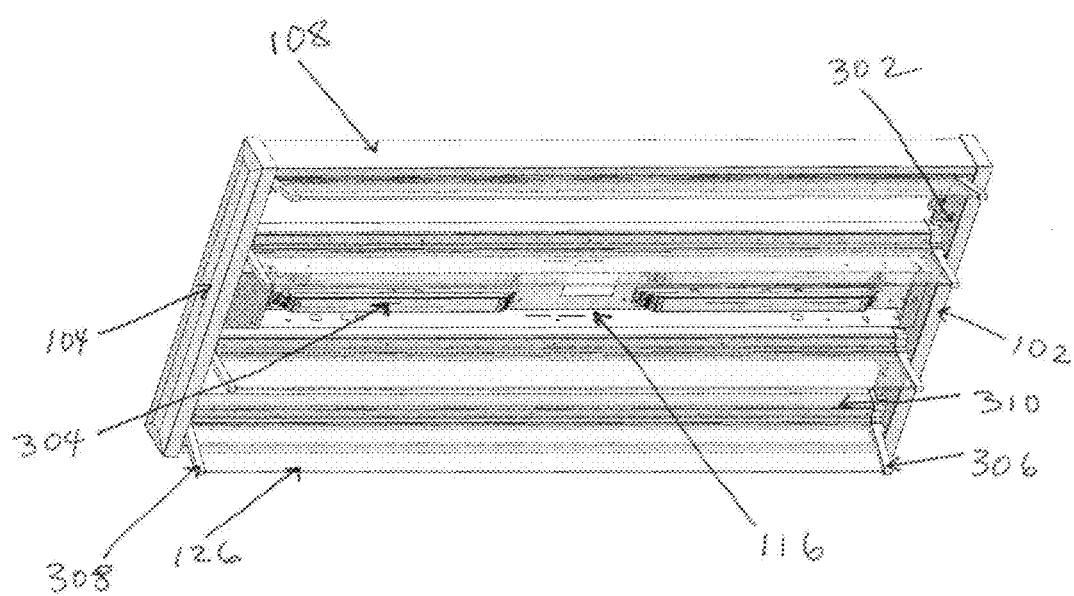
FIG. 3A is an angular bottom view of the edge-lit lighting fixture of FIG. 1 without a bottom center beam cover in accordance with an example embodiment.
Figure 3B:
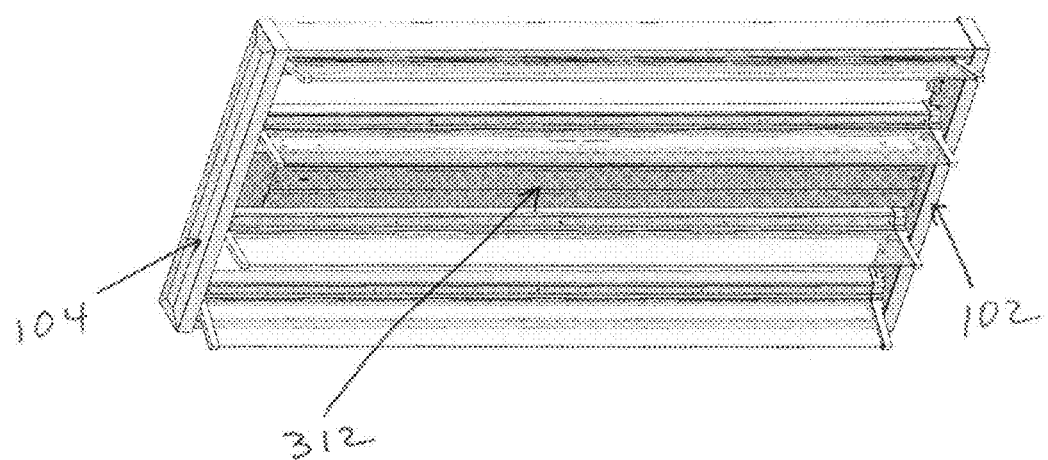
FIG. 3B is another angular bottom view of the edge-lit lighting fixture of FIG. 1 with a bottom center beam cover in accordance with an example embodiment.

FIG. 3A is an angular bottom view of the center beam edge-lit lighting fixture of FIG. 1 without a bottom center beam cover in accordance with an example embodiment. FIG. 3B is another angular bottom view of the center beam edge-lit lighting fixture of FIG. 1, but with a bottom center beam cover in accordance with an example embodiment.

As illustrated in FIG. 3A, one or more drivers (e.g., LED drivers) 304 may be positioned inside the center beam 116. For example, the one or more drivers 304 may be attached to the top side of the center beam 116 on the inside surface of the center beam 116. The one or more drivers 304 may provide power to light sources, such as LEDs. As illustrated in FIG. 3B, center beam cover 312 may hide from view the one or more drivers 304 and any other electronic component that is positioned within the center beam 116. Because the center beam 116 extends the entire length of the edge-lit lighting fixture 100, the center beam 116 can generally hold various shapes and sizes of drivers and other electronic components of the edge-lit lighting fixture 100.

In some example embodiments, the LEPs 120, 122, 124, and 126 are supported by two LEP brackets that are each attached to either a first end 302 or the second end panel 114 shown in FIG. 1. To illustrate with respect to the fourth LEP 126, the fourth LEP 126 is supported by the LEP bracket 306 and LEP bracket 308. The LEP bracket 306 is attached to the first end panel 302, and the LEP bracket 308 is attached to the second end panel 114 that is more clearly shown in FIG. 1. The fourth LEP 126 is also attached to a heat sink 310 that may include one or more light sources (e.g., LEDs) that are positioned thereon. The heat sink 310 is designed to dissipate heat from the light sources and any related components such as a printed circuit board (PCB). In some example embodiments, the heat sink 310 may rest on the fourth LEP 126. Alternatively or in addition, the LEP brackets 306, 308 may support the heat sink 310 and maintain attachment of the heat sink 310 to the LEP 126. In an example embodi-ment, each of the LEP brackets 306, 308 correspond to the LEP bracket 1000 described with respect to FIGS. 10A and 10B or the LEP bracket 1100 described with respect to FIGS. 11A-11C.

In some example embodiments, the LEP brackets 306, 308 may be fixedly attached to their respective end panel 302 or 114 in a vertical or slanted position relative to a vertical axis. Alternatively, the LEP brackets 306, 308 may be rotatably attached to the end panels 302, 114. The above description with respect to the fourth LEP 126 and its respective LEP brackets 306, 308 is equally applicable to the other LEPs 120, 122, and 124 and their respective LEP brackets.

Figure 4A:
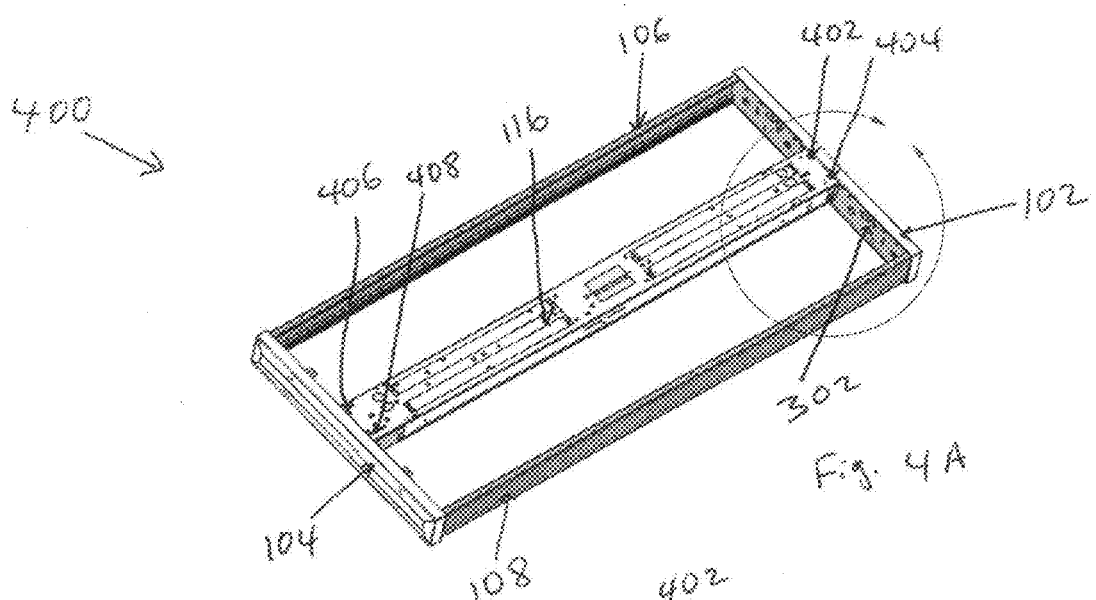
FIG. 4A is a top view of an edge-lit lighting structure of the edge-lit lighting fixture of FIG. 1 in accordance with an example embodiment.
Figure 4B:
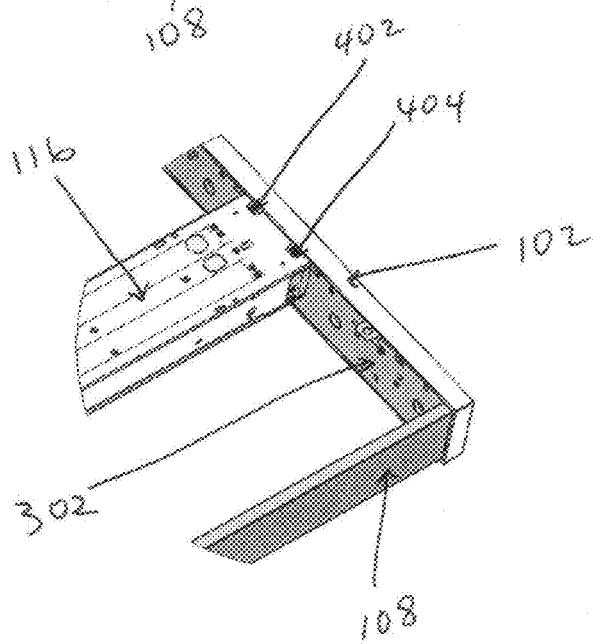
FIG. 4B is a close-up view of a portion of the edge-lit lighting structure of FIG. 4A in accordance with an example embodiment.

FIG. 4A is a top view of an edge-lit lighting structure of the center beam edge-lit lighting fixture of FIG. 1 in accordance with another example embodiment. FIG. 4B is a close-up view of a portion of the edge-lit lighting structure of FIG. 4A in accordance with an example embodiment. As illustrated in FIGS. 4A and 4B, the edge-lit lighting structure 400 includes the first end cap 102 and the second end cap 104. The first end cap 102 is attached to the first end panel 302, and the second end cap 104 is attached to the second end panel 114 (shown in FIG. 1). The edge-lit lighting structure 400 also includes the first side panel 106, the second side panel 108, and the center beam 116. The first side panel 106 extends between the first end panel 302 and the second end panel 114 at a first longitudinal side of the edge-lit lighting structure 400. The second side panel 108 extends between the first end panel 302 and the second end panel 114 at a second longitudinal side of the edge-lit lighting structure 400.

The center beam 116 extends between the first end panel 302 and the second end panel 114. For example, the center beam 116 may be attached to the first end panel 302 and the second end panel 114. The center beam 116 may be made from sheet metal, such as aluminum sheet metal, and may be hollow. For example, a particular shape of the center beam 116 may be formed by pressing a flat sheet metal into the desired shape and cutting out openings as needed. Alternatively, the center beam 116 may be made using a die cast process.

In some example embodiments, the center beam 116 is attached to the first end panel 302 using screws 402, 404. To illustrate, two attachment tabs may extend horizontally from the first end panel 302, and each screw 402, 404 may be fastened through a respective hole in the center beam 116 and through a respective one of the attachment tabs. In some alternative embodiments, other attachment means, such as rivets, may be used instead of screws 402, 404. Similarly, the center beam 116 may be attached to the second end panel 114 using screws 406, 408, or other attachment means, such as rivets.

FIG. 5A is a bottom view of the edge-lit lighting structure of FIG. 4A in accordance with another example embodiment. FIG. 5B is close-up view of a portion of the edge-lit lighting structure of FIG. 5A in accordance with an example embodiment.

As illustrated in FIGS. 5A and 5B, a first enter beam coupler 502 and a second center beam coupler 504 may be used to attach the center beam 116 to the first end panel 302 and to the second end panel 114 (shown in FIG. 1), respectively. The first center beam coupler 502 and the second center beam coupler 504 may be used instead of or in addition to the screws 402, 404, 406, and 408 shown in FIG. 4A. The first center beam coupler 502 may be coupled to the first end panel using one or more screws shown in FIG. 6. The second center beam coupler 504 may be coupled to the second end panel 114 in a similar manner. The center beam 116 may rest on the first center beam coupler 502 and the second center beam coupler 504 as illustrated in FIG. 5A. The center beam 116 may also be fastened to the first center beam coupler 502 and the second center beam coupler 504 using respective fasteners, such as screws. In some example embodiments, to securely attach the center beam cover 312 to the center beam 116, a portion of the center beam cover 312 may be positioned between the first center beam coupler 502 and the center beam 116 at one end, and another portion of the center beam cover 312 may be positioned between the second center beam coupler 504 and the center beam 116 at an opposite end. Further, fasteners extending through the first center beam coupler 502 and the second center beam coupler 504 may also extend through center beam cover 312.

In some example embodiments, the first end panel 302 includes LEP bracket openings 506, 508, 510, 512, as illustrated in FIG. 5B. The second end panel 114 also includes corresponding LEP bracket openings. Each of the LEP bracket openings 506, 508, 510, 512 is used for attaching a corresponding LEP bracket, such as the LEP bracket 306 illustrated in FIG. 3A, to the first end panel 302. Each of the corresponding LEP bracket openings in the second end panel 114 is also used for attaching a corresponding LEP bracket, such as the LEP bracket 308 illustrated in FIG. 3A, to the second end panel 114. To illustrate, the LEP bracket opening 506 may be used to attach an LEP bracket to the first end panel 302, and a corresponding LEP bracket opening in the second end panel 114 may be used to attach the LEP bracket to the second end panel 114, where an LEP, such as the LEP 120 of FIG. 1, may be supported by the LEP brackets.

FIG. 6 is a partially exploded view of the edge-lit lighting fixture of FIG. 1 showing wire routing in accordance with an example embodiment. As illustrated in FIG. 6, the first end panel 302 includes a wire opening 602 that allows wires from one or more drivers positioned within the center beam 116 to be extended therethrough. For example, as illustrated in FIG. 6, one or more wires 604 may extend through the wire opening 602 to a connector 614. Similarly, other wires may extend through the opening 602 to connectors 616, 618, 620. For example, the connectors 614, 616, 618, 620 allow convenient wire connections to be made between one or more drivers positioned within the center beam 116 and light sources that produce the light provided by the edge-lit lighting fixture 100. In some alternative embodiments, the connectors 614, 616, 618, 620 may be conveniently positioned openings instead of physical connectors. Similar wire routing may be included with respect to the second end panel 114.

As illustrated in FIG. 6, a support protrusion 606 of an LEP bracket 626 may extend through the LEP bracket opening 506 illustrated in FIG. 5B. Similarly, a support protrusion of other LEP brackets may extend through a corresponding one of the LEP bracket openings 508, 510, 512 shown in FIG. 5B to attach the particular LEP bracket to the first end panel 302. Corresponding LEP brackets may also be attached to the second end panel 114 in a similar manner. Although support protrusions of the LEP brackets are described as being used to attach the LEP brackets to the end panels 114, 302, in alternative embodiments, other means such as fasteners may be used to attach the LEP brackets to the end panels 114, 302.

In some example embodiments, fasteners 610 and 612 (e.g., screws or rivets) may be used to attach the center beam coupler 502 to the first end panel 302 in the manner described with respect to FIGS. 5A and 5B. Similar fasteners may be used to attach the center beam coupler 504 to the second end panel 114 shown in FIG. 1.

FIG. 7 illustrates an end panel of the edge-lit lighting fixture of FIG. 1 showing wire routing in accordance with another example embodiment. As illustrated in FIG. 7, one or more wires 704 may extend through the wire opening 602 from, for example, one or more drivers, such as the one or more drivers 304 of FIG. 3A, positioned within the center beam 116. The one or more wires 704 may be routed to one or more light sources of the edge-lit lighting fixture 100 through a support protrusion 702 of the bracket 306. As illustrated in FIG. 7, the support protrusion 702 of the LEP bracket 306 may extend through the LEP bracket opening 512 in the end panel 302. Other wires may extend through the wire opening 602 (for example, from one or more other drivers positioned in the center beam 116) and may be routed to respective light sources, such as LEDs, in a similar manner. Further, in some example embodiments, wires may be extended through a similar wire opening in the second end panel 114 and may be routed to light sources through support protrusions of LEP brackets.

FIGS. 8A-D illustrate the edge-lit lighting fixture 100 of FIG. 1 with the LEPs in various orientations in accordance with an example embodiment. In an example embodiment, the width of the edge-lit lighting fixture 100 is 22.37 inches, and the height of the lighting fixture 100 is approximately 2.36 inches. As illustrated in FIG. 8A, each of the LEPs 120, 122, 124, 126 may be rotated to a substantially horizontal position relative to a bottom edge 802 of the first end cap 102 of the edge-lit lighting fixture 100. For example, the edge-lit lighting fixture 100 may be shipped with the LEPs 120, 122, 124, 126 rotated to such substantially horizontal positions to reduce shipping size of the edge-lit lighting fixture 100. FIG. 8B illustrates each of the LEPs 120, 122, 124, 126 rotated/positioned in a vertical position relative to the bottom edge 802 of the first end cap 102. FIG. 8C illustrates the LEPs 120 and 126 rotated into a non-vertical position (for example, 20 degrees from the vertical position shown in FIG. 8B). FIG. 8D illustrates all of the LEPs 120, 122, 124, 126 rotated into a non-vertical position (for example, 20 degrees from the vertical position shown in FIG. 8B). One or more of the LEPs may be rotated into a vertical or a non-vertical position relative to the bottom edge 802 of the first end cap 102 to adjust distribution of light provided by the edge-lit lighting fixture 100. Although each of the FIGS. 8A-8D illustrates two or more of the LEPs 120, 122, 124, 126 rotated into a similar position, each of the LEPs 120, 122, 124, 126 may be rotated independent of the others. Further, although FIGS. 8A-8D illustrate the lighting fixture 100 has four LEPs, in alternative embodiments, the edge-lit lighting fixture 100 may have fewer or more than four LEPs. An edge-lit lighting fixture with only two LEPs is illustrated in FIGS. 9A-9C.

Referring to FIGS. 9A-C, a two-LEP edge-lit lighting fixture with the LEPs in various orientations is illustrated in accordance with an example embodiment. As illustrated in FIGS. 9A-9C, an edge-lit lighting fixture 900 may have only two LEPs. For example, the edge-lit lighting fixture 900 includes the LEPs 922 and 924. In an example embodiment, the width of the edge-lit lighting fixture 900 is approximately 17.5 inches, and the height of the edge-lit lighting fixture 100 is approximately 2.36 inches. Each of the LEPs 922 and 924 may be rotated into a substantially horizontal position relative to a bottom edge 904 of the first end cap 902 of the edge-lit lighting fixture 900. For example, the edge-lit lighting fixture 900 may be shipped with the LEPs 922 and 924 rotated into a substantially horizontal position to reduce shipping size of the edge-lit lighting fixture 900. FIG. 9B illustrates each of the LEPs 922 and 924 rotated/positioned in a vertical position relative to the bottom edge 904 of the first end cap 102. FIG. 9C illustrates the LEPs 922 and 924 rotated into a non-vertical position (for example, 20 degrees from the vertical position shown in FIG. 9B). One or both of the LEPs 922 and 924 may be rotated into a vertical or a non-vertical position relative to the bottom edge 904 of the first end cap 902 to adjust distribution of light provided by the edge-lit lighting fixture 900.

FIGS. 10A and 10B illustrate a light emitting panel (LEP) bracket in accordance with an example embodiment. The LEP bracket 1000 is a device that can be used to attach an LEP to an end panel, such as the end panels 114, 302 of FIGS. 1 and 3A. The LEP bracket 1000 includes a channel 1002 configured to receive a portion of a narrow side of an LEP. The channel 1002 can designed to have different sizes, including depth, for use with different size LEPs. The channel 1002 is defined by a first side wall 1004, a second side wall 1006, a back wall 1008, and an end wall 1010. The back wall 1008 extends between a longitudinal edge of the first side wall 1004 and a corresponding longitudinal edge of the second side wall 1006.

The end wall 1010 is coupled to the first side wall 1004 and to the second side wall 1006. The end wall 1010 extends between the first side wall 1004 and the second side wall 1006, and is substantially perpendicular to the first side wall 1004 and to the second side wall 1006. To illustrate, a portion of the narrow side of the LEP may be in contact and rest on the end wall 1010 when the LEP bracket 1000 is in a vertical orientation as shown in FIGS. 10A and 10B. In some example embodiments, the end wall 1010 is coupled and substantially perpendicular to the back wall 1008. In some example embodiments, the spacing between the first side wall 1004 and the second side wall 1006 may be slightly narrower at the back wall 1008 than at the opening of the channel 1002.

The LEP bracket 1000 also includes a heat sink frame portion that is coupled to the channel 1002 and shaped to hold a heat sink that may be used with an LEP, as illustrated in the example embodiment shown in FIG. 14. The heat sink frame portion may have a first frame segment 1014 and a second frame segment 1016 that are designed to be positioned on opposite sides of a heat sink. To illustrate, the first frame segment 1014 may extend from the first side wall 1004 of the channel 1002, and the second frame segment 1016 may extend from the second side wall 1006 of the channel 1002. In some example embodiments, the first frame segment 1014 and the second frame segment 1016 may be shaped to conform to respective outer portions of a heat sink that may be used with an LEP intended to be supported by the LEP bracket 1000.

In some example embodiments, the heat sink frame portion may also include a first heat sink lock tab 1022 that extends inward from an end portion of the first frame segment 1014. The heat sink frame portion may further include a second heat sink lock tab 1024 that also extends inward from an end portion of the second frame segment 1016. Each of the heat sink lock tabs 1022 and 1024 has a side that is tapered as it extends inward from the respective frame segment 1014 or 1016. The tapered side of each heat sink lock tab 1022, 1024 allows for ease of insertion of a heat sink from a top side (in the orientation shown in FIGS. 10A and 10B) of the LEP bracket 1000.

To illustrate, in the process of being inserted into the LEP bracket 1000 from the top side of the LEP bracket 1000, a heat sink (e.g., the heat sink shown in FIG. 14) may press against the tapered sides of the heat sink lock tabs 1022, 1024. The force from the insertion of the heat sink may push the heat sink snap locks 1022, 1024 away from each other, providing a wider opening between the heat sink lock tabs 1022, 1024. For example, in response to the force exerted on the heat sink lock tabs 1022, 1024, the upper portions of the frame segments 1014, 1016 may lean outwardly away from each other, pulling the heat sink lock tabs 1022, 1024 further apart. Once the heat sink passes through between the heat sink lock tabs 1022, 1024, the upper portions of the frame segments 1014, 1016 may snap back to their original positions, which brings the heat sink lock tabs 1022, 1024 closer. Once the heat sink is inserted through the opening between the two heat sink lock tabs 1022, 1024, the heat sink lock tabs 1022, 1024 are shaped to prevent the heat sink from sliding out between them.

As illustrated in FIG. 10B, the LEP bracket 1000 may include a support protrusion 1032 for insertion into an LEP bracket opening, such as the LEP bracket openings 506, 508, 510, 512, illustrated in FIG. 5B. The support protrusion 1032 may rotatably attach the LEP bracket 1000 to the end panel (e.g., the first end panel 302 shown in FIG. 3A) of an edge-lit lighting structure, such as the edge-lit light structure 400 of FIG. 4A. For example, the support protrusion 1032 may be shaped to be rotatable within an LEP bracket opening of an end panel. To illustrate, the LEP bracket opening may be substantially circular, and the support protrusion 1032 may have a curved outer surface that is in contact with the perimeter of the substantially circular LEP bracket opening. Thus, as the LEP bracket 1000 rotates about the LEP bracket opening, an LEP that is supported by the LEP bracket 1000 also rotates.

In some example embodiments, the LEP bracket 1000 may also include a first end panel snap lock 1034 and a second end panel snap lock 1036 that are designed to be inserted into the LEP bracket opening, such as the LEP bracket openings 506, 508, 510, 512. The end panel snap locks 1034, 1036 are designed to retain the LEP bracket 1000 attached to an end panel once the support protrusion 1032 is inserted into the LEP bracket opening of the end panel. As illustrated in FIG. 10B, the end panel snap lock 1034 has a wedge-shaped end portion 1026, and the end panel snap lock 1036 has a wedge-shaped end portion 1028. The wedge-shaped end portions 1026, 1028 require pressure to be applied on the sides of the end panel snap locks 1034, 1036 to remove the support protrusion 1032 from an LEP bracket opening.

In some alternative embodiments, the LEP bracket 1000 may have just one of the end panel snap locks 1034, 1036. For example, the LEP bracket 1000 may have a single end panel snap lock that is a combination of the end panel snap locks 1034 and 1036. In yet another alternative embodiment, the LEP bracket 1000 may have more than two end panel snap locks that operate to retain the LEP bracket 1000 attached to the end panel.

In some example embodiments, the LEP bracket 1000 may also include a first position snap lock 1018 and a second position snap lock 1020. The first position snap lock 1018 may be coupled to a horizontal segment extending from the first frame segment 1014. Similarly, the second position snap lock 1020 may be coupled to another horizontal segment extending from the second frame segment 1016. One or both of the first position snap lock 1018 and the second position snap lock 1020 may be inserted into a corresponding position lock opening of an end panel to maintain the LEP bracket 1000 in a particular position.

For example, once the LEP bracket 1000 is rotated to a particular position, the first position snap lock 1018 may be partially inserted into a position lock opening to prevent further rotation of the LEP bracket 1000 until the first snap lock 1018 is removed from the position lock opening. Position lock openings of an end panel are described below with respect to FIG. 13. In some example embodiments, only one of the first snap lock 1018 and the second snap lock 1020 may be used to lock the LEP bracket 1000 in a particular position. In some alternative embodiments, both of the first snap lock 1018 and the second snap lock 1020 can be used simultaneously to lock the bracket in a particular position. Accordingly, a user can rotate and lock the LEP bracket 1000 in a particular position using one or both of the first position snap lock 1018 and the second snap lock 1020. In alternative embodiments, the position snap locks 1018 and 1020 may have other shapes and operate in a similar manner without departing from the scope of this disclosure.

In some example embodiments, the LEP bracket 1000 may include a back-stop portion 1012 protruding from the back wall 1008. The back-stop portion 1012 is designed to limit further movement of the LEP bracket toward an end panel of an edge-lit lighting structure after the LEP bracket 1000 is attached to the end panel. By preventing further movement of the LEP bracket 1000 toward an end plate, the back-stop portion 1012 can prevent an LEP supported by the LEP bracket 1000 from falling out of the LEP bracket 1000.

In some example embodiments, the LEP bracket 1000 may include horizontal bars 1030 and 1038 that provide structural rigidity to the LEP bracket 1000. In some alternative embodiments, the horizontal bars 1030, 1038 may be joined to form a single horizontal bar that provides structural rigidity to the LEP bracket 1000. Further, in some example embodiments, another non-horizontal structure may also be used instead of the horizontal bars 1030, 1038.

In some example embodiments, the LEP bracket 1000 may be made from a plastic material, such as polycarbonate that can be exposed to a relatively large deforming force without cracking or breaking. For example, the LEP bracket 1000 can be made using techniques such as injection molding. Although example uses of the LEP bracket 1000 are described with respect to end panels of an edge-lit lighting structure or an edge-lit lighting fixture, the LEP bracket 1000 may be used with other elements of a lighting structure or fixture that has the openings that enable use of the LEP bracket 1000. For example, the LEP bracket 1000 may be used with a panel that is positioned between end panels of an edge-lit lighting structure or fixture. Further, use of the LEP bracket 1000 is not limited to the edge-lit lighting fixture 100 or edge-lit lighting structure 400 and may be used with various edge-lit lighting fixtures and structures.

Figure 11A:
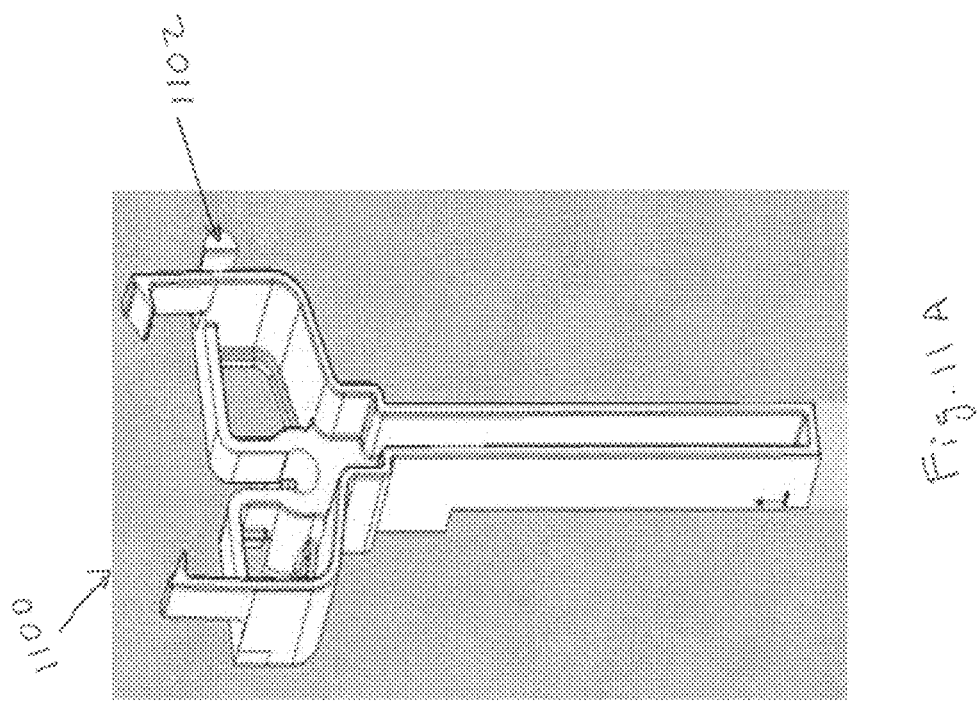
Figure 11B:
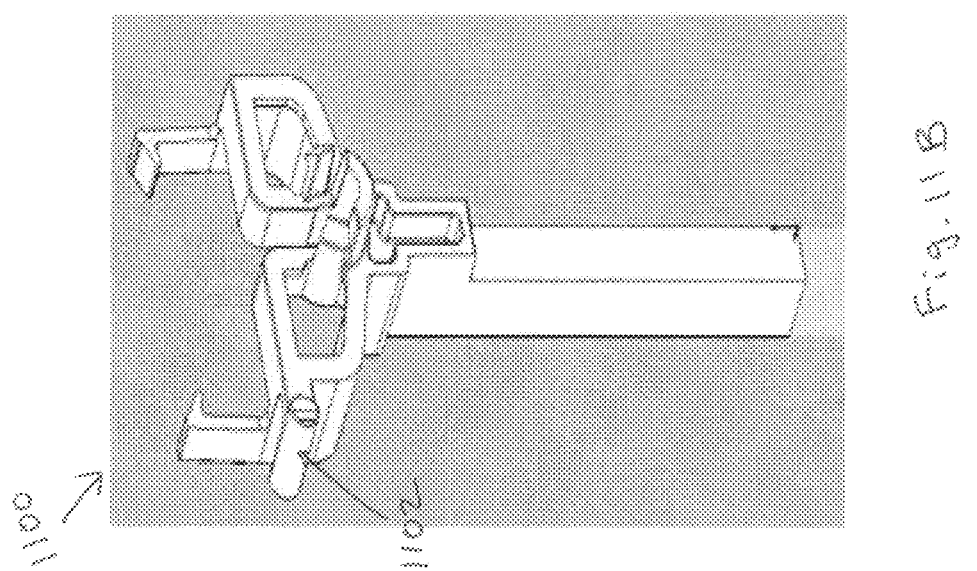

FIGS. 11A-11C illustrate an LEP bracket 1100 in accordance with another example embodiment. The LEP bracket 1100 performs the same function described with respect to the LEP bracket 1000. The primary difference between the LEP bracket 1100 of FIGS. 11A-11C and the LEP bracket 1000 of FIGS. 10A and 10B is the number of position snap locks. As illustrated in FIGS. 11A-11C, the LEP bracket 1100 has one position snap lock 1102 while the LEP bracket 1000 has two position snap locks 1018 and 1020. In an example embodiment, the position snap lock 1102 of the LEP bracket 1100 is the same as the position snap lock 1020 of the LEP bracket 1000. The position snap lock 1102 serves the same purpose as the position snap locks 1018, 1020 described with respect to the LEP bracket 1000.

FIG. 12 illustrates an operation of the position snap locks of the LEP bracket of FIGS. 10A and 10B in accordance with an example embodiment. As illustrated in FIG. 12, the position snap lock 1018 has a chamfered surface 1202, and the position snap lock 1020 has a chamfered surface 1204. As illustrated with respect to the position snap lock 1018, a force may be applied on the position snap lock 1018 in the direction shown by the dotted arrow 1206 to move the portion of the position snap lock 1018 that includes the chamfered surface 1202 in the direction shown by the curved arrow 1208. For example, if the portion of the position snap lock 1018 that includes the chamfered surface 1202 is partially positioned in a position lock opening of an end panel, exerting a force on the position snap lock 1018 in the direction shown by the dotted arrow 1206 may push/rotate the position snap lock 1018 out of the position lock opening in the direction shown by the curved arrow 1208. The position snap lock 1020 operates in a similar manner as the position snap lock 1018. Further, the position snap lock 1102 of the LEP bracket 1100 of FIG. 11 operates in a manner similar to the position snap locks 1018, 1020.

FIG. 13 illustrates the LEP bracket 1100 of FIGS. 10A and 10B attached to an end panel in accordance with an example embodiment. As illustrated in FIG. 13, an end panel 1302 includes a first position lock opening 1304, a second position lock opening 1306, and a third position lock opening 1308. A support protrusion 1032 of the LEP bracket 1000 is inserted in an LEP bracket opening 1310 of the end panel 1302. In some example embodiments, the LEP bracket opening 1310 similar to the LEP bracket openings 506, 508, 510, 512, illustrated in FIG. 5B. For example, the end panel 1302 may correspond to the end panel 302 of FIG. 3A, and the LEP bracket opening 1310 may correspond to the LEP bracket opening 512 of FIG. 5B.

In some example embodiments, the position snap lock 1020 may be inserted in one of the position lock openings 1304, 1306, 1308 after the LEP bracket 1000 is rotated about the LEP bracket opening 1310 to line up the position snap lock 1020 with the particular position lock opening 1304, 1306, or 1308. Once the position snap lock 1020 is inserted in a particular position lock opening 1304, 1306, or 1308, the LEP bracket 1000 along with the LEP that the LEP bracket 1000 supports remain in the particular position until the position snap lock 1020 is moved out of the position lock opening, for example, in the manner described with respect to FIG. 12.

To illustrate, the position snap lock 1020 may be inserted into the third position lock opening 1308 to position the LEP bracket 1000 (and a supported LEP) in a substantially horizontal orientation. As another example, the position snap lock 1020 may be inserted into the first position lock opening 1304 to position the LEP bracket 1000 (and a supported LEP) in an orientation that is approximately 20 degrees from a vertical axis extending through the LEP bracket opening 1310. As yet another example, the position snap lock 1020 may be inserted into the second position lock opening 1306 to position the LEP bracket 1000 (and a supported LEP) in a substantially vertical orientation.

Although three position lock openings are illustrated in FIG. 13, in alternative embodiments, the end panel 1302 may include fewer or more than three position lock openings. Further, although FIG. 13 is described above with respect to the position snap lock 1020, the position snap lock 1018 may be used in addition to or instead of the position snap lock 1020 in a similar manner described with respect to the position snap lock 1020. Although FIG. 13 shows the LEP bracket 1000, in some alternative embodiments, the LEP bracket 1100 of FIG. 11 may be used in the manner described above without departing from the scope of this disclosure.

FIG. 14 illustrates the LEP bracket 1000 of FIGS. 10A and 10B attached to an end cap of an edge-lit lighting structure, and a cross section of an LEP 1402 that is supported by the LEP bracket 1000 in accordance with an example embodiment. For example, the LEP 1402 may correspond to the fourth LEP 126 of FIG. 1. As illustrated in FIG. 14, the LEP 1402 is supported by the LEP bracket 1000. A portion of the LEP 1402 is positioned within the channel 1002 (illustrated in FIG. 10A) of the LEP bracket 1000. As illustrated, for example, in FIG. 3A, the opposite longitudinal end of the LEP 1402 may be positioned within a channel of another LEP bracket attached to an opposite end panel.

In the orientation shown in FIG. 14, a heat sink 1404 is positioned above the LEP 1402, such that a longitudinal narrow side of the LEP 1402 is positioned within the heat sink 1404. In some example embodiments, the heat sink 1404 may rest on the LEP 1402 and may not be directly supported by the LEP bracket 1000. For example, the LEP bracket 1000 may be sized such that when the LEP 1402 rests on the end wall 1010, the heat sink 1404 is elevated slightly above lower sides of the first frame segment 1014 (shown in FIG. 10A) and the second frame segment 1016. As illustrated in FIG. 14, a gap 1410 may exist between the heat sink 1404 and the lower side of the second frame segment 1016. A similar gap may exist between the heat sink 1404 and the lower side of the first frame 1014. The gap 1410 enables the heat sink 1404 to maintain the spacing between heat sink 1404 and the LEP 1402 when the LEP 1402 shrinks in size in response to, for example, a low temperature. To illustrate, when the LEP 1402 shrinks in response to a low temperature, such that the gap 1410 may decrease in size as the LEP 1402

One or more LEDs 1406 are positioned between the longitudinal narrow side of the LEP 1402 and a surface of the heat sink 1404. The one or more LEDs 1406 may be a discrete LED or LEDs, one or more organic light-emitting diodes (OLEDs), an LED chip on board that includes one or more discrete LEDs, an array of discrete LEDs, or light source(s) other than LEDs. The one or more LEDs 1406 may be oriented to emit light into the LEP 1402 through the longitudinal narrow side of the LEP 1402. For example, the one or more LEDs 1406 may be positioned on a printed circuit board (PCB) that is attached to the surface of the heat sink 1404 by various means including an adhesive.

In some example embodiments, the LEP 1402 may be attached to the heat sink 1404 using a friction force exerted by side walls 1408 of the heat sink 1404. Alternatively or in addition, the LEP 1402 may be secured to the heat sink 1404 using one or more screws that extend through the heat sink 1404 and the LEP 1402.

Once the LEP bracket 1000 is attached to the end panel 1302 as illustrated in FIG. 13, and once another LEP bracket 1000 is attached to an opposite end panel of an edge-lit lighting structure, the LEP 1402 may be inserted into the channel 1002 (shown in FIG. 10A) of each LEP bracket 1000 by sliding down from the top in the orientation shown in FIG. 14. The LEP 1402 may already be attached to the heat sink 1404 when the LEP 1402 is inserted into the channel of the LEP bracket 1000. Alternatively, the heat sink 1404 may be attached to the LEP 1402 after the LEP 1402 is inserted into the channel of the LEP bracket 1000.

As illustrated in FIG. 14, the position snap lock 1020 is inserted in the second position lock opening 1306, and the LEP 1402 is in a vertical orientation. To change the orientation of the LEP 1402, the position snap lock 1020 can be moved out of the second position lock opening 1306 and inserted into the first position lock opening 1304 or the position lock opening 1308. For example, the position snap lock 1020 may be inserted into the third position lock opening 1308 to position the LEP 1402 in a substantially horizontal orientation. Orienting the LEP 1402 and other LEPs of an edge-lit lighting fixture, such as the edge-lit lighting fixture 100 of FIG. 1, can reduce the overall size of the edge-lit lighting fixture, for example, for the purpose of shipping and or storing the edge-lit lighting fixture. Further, the LEP bracket 1000 enables users to change light distribution of light from an edge-lit lighting source with ease by rotating LEP brackets along with the supported LEPs of the lighting fixture.

Although FIG. 14 is described with respect to the LEP bracket 1000, in some alternative embodiments, the LEP bracket 1100 of FIG. 11 may be used in the manner described above without departing from the scope of this disclosure.

FIG. 15 illustrates wire routing through the LEP bracket 1000 of FIGS. 10A and 10B in accordance with an example embodiment. One or more wires 1502 may be routed through the LEP bracket 1000 to be connected to a driver (e.g., an LED driver) that may be positioned, for example, in a center beam, such as the center beam 116 of FIG. 1. The one or more wires 1502 are electrically coupled to the one or more LEDs 1406. For example, the one or more LEDs 1406 may be positioned on a PCB board that is connected to the one or more wires 1502. When the support protrusion 1032 is inserted in an LEP bracket opening, such as the LEP bracket opening 512 of FIG. 5B, the one or more wires 1502 extend through the LEP bracket opening as well. To illustrate, in an example embodiment, the one or more wires 1502 may correspond to the one or more wires 704 of FIG. 7.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:
1. An edge-lit lighting fixture, comprising:
   a first light emitting panel (LEP), wherein light from a first light emitting diode (LED) that enters the first LEP through a narrow side of the first LEP is emitted through a broad side of the first LEP and wherein the narrow side of the first LEP is narrower than the broad side of the first LEP;
   a second LEP, wherein light from a second LED that enters the second LEP through a narrow side of the second LEP is emitted through a broad side of the second LEP and wherein the narrow side of the second LEP is narrower than the broad side of the second LEP; and
   an edge-lit lighting structure comprising:
      a first end panel;
      a second end panel;

a first side panel extending between the first end panel and the second end panel at a first longitudinal side of the edge-lit lighting structure;

a second side panel extending between the first end panel and the second end panel at a second longitudinal side of the edge-lit lighting structure opposite the first longitudinal side; and a center beam having a hollow portion and a cover positioned on a lower side of the center beam below the hollow portion, the cover hiding the hollow portion from view, the center beam positioned between the first side panel and the second side panel and attached to the first end panel and the second end panel, wherein the first LEP and the second LEP are positioned between the first side panel and the second side panel and wherein the center beam is separated by a first space from the first side panel and by a second space from the second side panel.

2. The edge-lit lighting fixture of claim 1, further comprising:

a first end cap positioned on an outer side of the first end panel and attached to first end panel; and a second end cap positioned on an outer side of the second end panel and attached to second end panel.

3. The edge-lit lighting fixture of claim 1, further comprising a first LEP bracket and a second LEP bracket, wherein the first LEP bracket is attached to the first end panel and wherein the second LEP bracket is attached to the second end panel, and wherein the center beam is attached to the first end panel using the first LEP bracket.

4. The edge-lit lighting fixture of claim 1, further comprising a light emitting diode (LED) driver positioned within the center beam.

5. The edge-lit lighting fixture of claim 4, wherein a first LED is positioned proximal a narrow side of the first LEP and wherein a second LED is positioned proximal a narrow side of the second LEP.

6. The edge-lit lighting fixture of claim 5, further comprising:

a first heat sink positioned to dissipate heat from the first LED; and a second heat sink positioned to dissipate heat from the second LED.

7. The edge-lit lighting fixture of claim 1, wherein the first LEP and the second LEP are rotatably attached to the first end panel and to the second end panel.

8. The edge-lit lighting fixture of claim 1, wherein the center beam is made from sheet metal.

9. An edge-lit lighting fixture, comprising:

a first light emitting panel (LEP), wherein light from a first light source that enters the first LEP through a narrow side of the first LEP is emitted through a broad side of the first LEP and wherein the narrow side of the first LEP is narrower than the broad side of the first LEP;

a second LEP, wherein light from a second light source that enters the second LEP through a narrow side of the second LEP is emitted through a broad side of the second LEP and wherein the narrow side of the second LEP is narrower than the broad side of the second LEP; and an edge-lit lighting structure comprising:

a first end panel;

a second end panel;

a first side panel extending between the first end panel and the second end panel at a first longitudinal side of the edge-lit lighting structure;

a second side panel extending between the first end panel and the second end panel at a second longitudinal side of the edge-lit lighting structure opposite the first longitudinal side; and a center beam having a hollow portion, the center beam positioned between the first side panel and the second side panel and attached to the first end panel and the second end panel, wherein the first LEP is positioned between the center beam and the first side panel and wherein the second LEP is positioned between the center beam and the second side panel.

10. The edge-lit lighting fixture of claim 9, further comprising:

a first end cap positioned on an outer side of the first end panel and attached to first end panel; and a second end cap positioned on an outer side of the second end panel and attached to second end panel.

11. The edge-lit lighting fixture of claim 9, further comprising a light emitting diode (LED) driver positioned within the center beam.

12. The edge-lit lighting fixture of claim 9, wherein the first LEP and the second LEP are rotatably attached to the first end panel and to the second end panel.

* * * * *